Sept. 1, 1970 W. A. RAY 3,526,360
MAIN LINE VALVE WITH PILOT REGULATOR
Filed Oct. 18, 1968 3 Sheets-Sheet 1
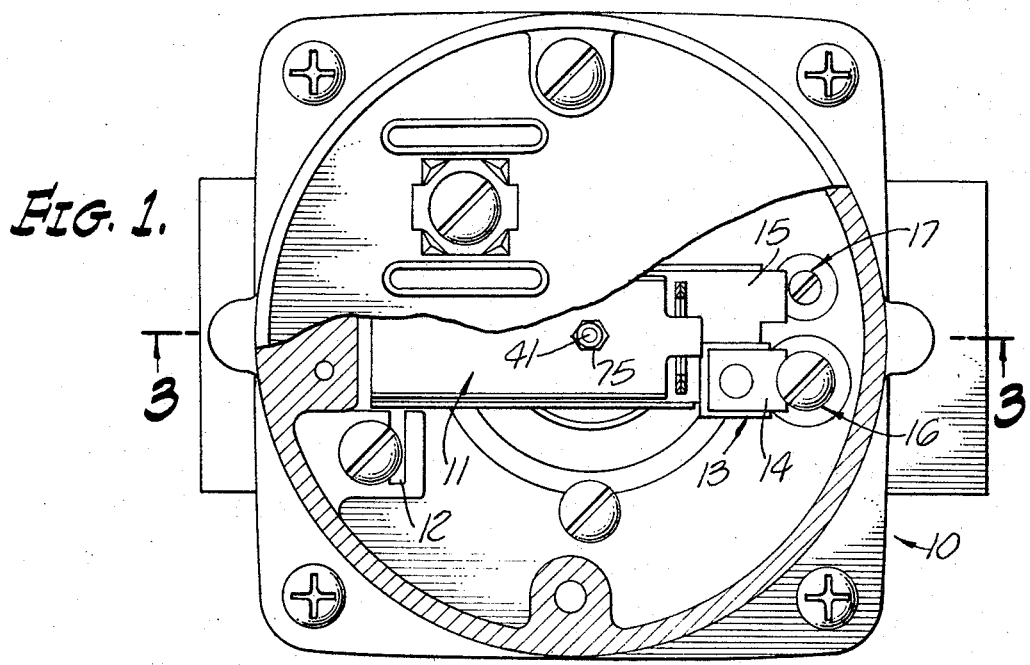
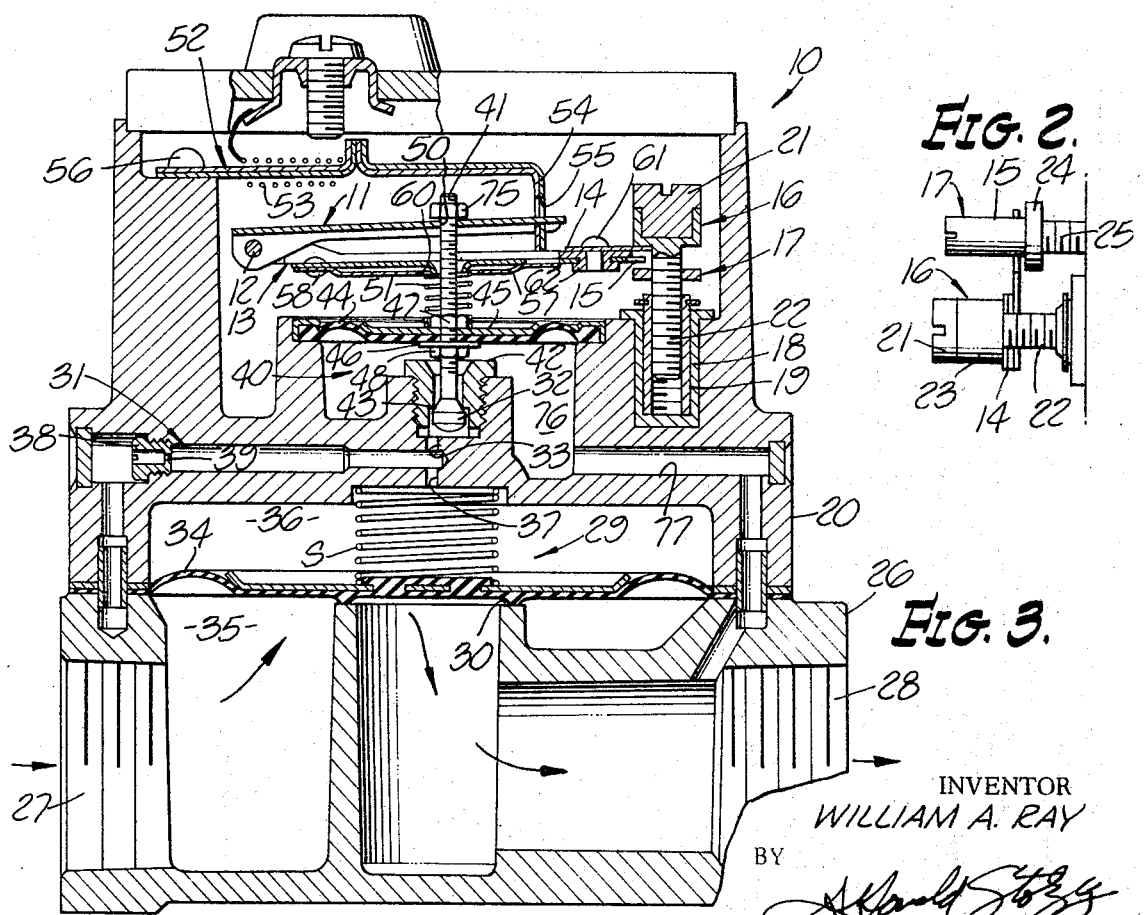
INVENTOR
WILLIAM A. RAY
BY
ATTORNEY

INVENTOR
WILLIAM A. RAY
BY
ATTORNEY

Sept. 1, 1970 W. A. RAY 3,526,360
MAIN LINE VALVE WITH PILOT REGULATOR
Filed Oct. 18, 1968 3 Sheets-Sheet 3
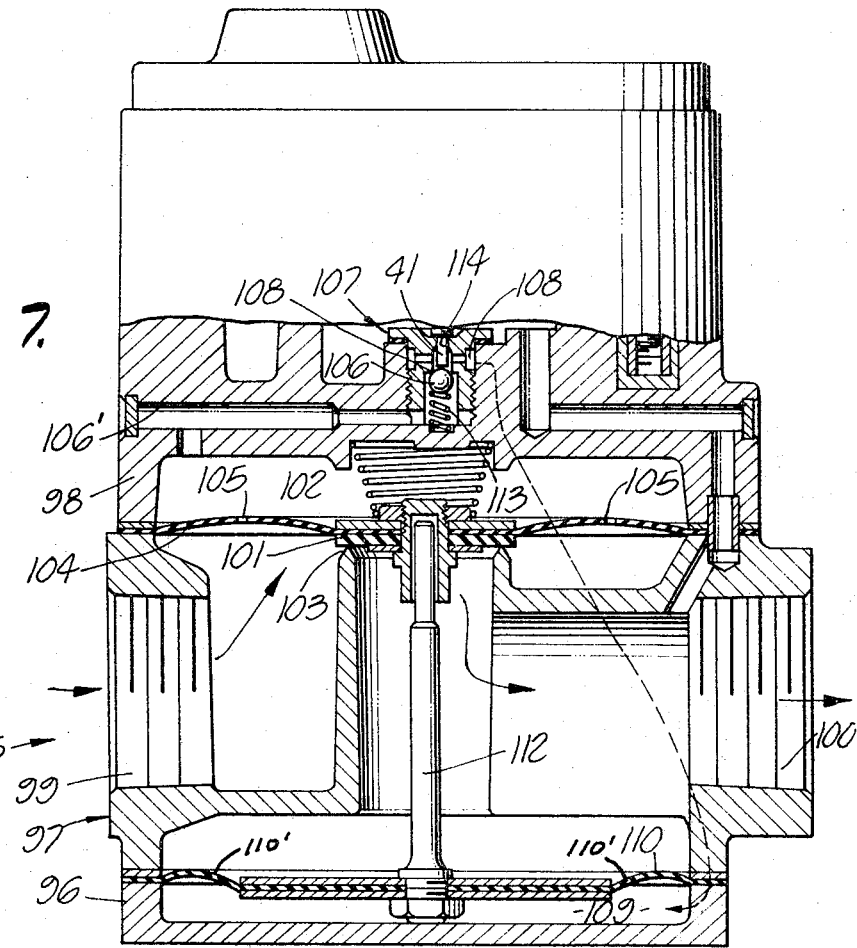
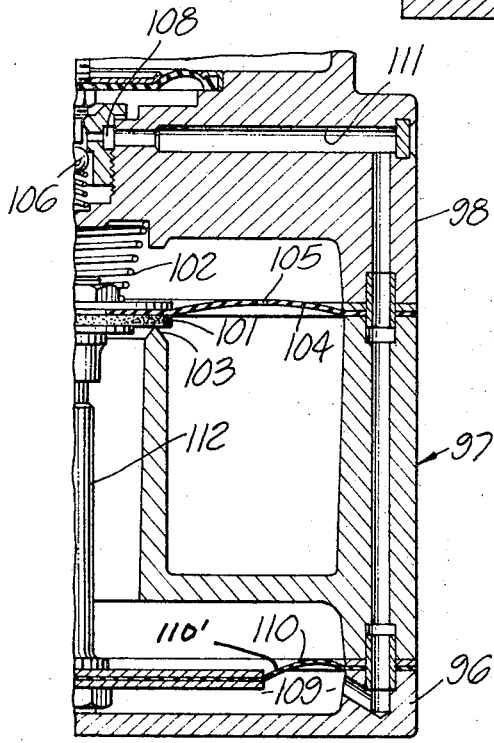
INVENTOR
WILLIAM A. RAY
BY
ATTORNEY United States Patent Office 3,526,360
Patented Sept. 1, 1970

3,526,360
MAIN LINE VALVE WITH PILOT REGULATOR
William A. Ray, North Hollywood, Calif., assignor to International Telephone and Telegraph Corporation, New York, N.Y., a corporation of Delaware
Filed Oct. 18, 1968, Ser. No. 768,732
Int. Cl. F16k *31/02, 31/165*
U.S. Cl. 236—68                                                   11 Claims

ABSTRACT OF THE DISCLOSURE

The invention includes a diaphragm type main line gas valve for a gas furnace which is controlled by a pilot. The pilot is a diaphragm type pressure regulator. However, a bimetallic strip with a heater is employed to overcome the regulator action to cause the main valve to open or to close. A control circuit is also provided in combination with the regulator, strip, and heater to cause regulating action selectively at two different regulated pressures in the outlet of the main valve to provide for a low fire and a high fire.

BACKGROUND OF THE INVENTION

This invention relates to fluid fuel valves, and more particularly to a main diaphragm valve which may be controlled by a pilot regulator.

In the past it has been the practice to employ a solenoid actuator to overcome the regulating action of a pilot regulator and to cause a main valve to open and to close. Such a device is disclosed in copending application, Ser. No. 562,160, filed June 30, 1966, by W. A. Ray for "High Capacity Diaphragm Valve." However, it is often desirable to employ a bimetallic strip with a heater to control the on and off operation of a main line gas valve or the like for the gas furnace of a residence. Further, it is also desirable to provide a regulated output for both a low fire and a high fire. However, there is no single valve, at present, which can perform all of these functions.

SUMMARY OF THE INVENTION

In accordance with the device of the present invention, the above-described and other disadvantages of the prior art are overcome by providing a main line valve with a pilot regulator. The "pilot" in this case is a servo control valve for the main valve, as opposed to a regulator for the pilot burner or pilot flame of a gas furnace.

The pilot regulator of the invention produces a regulated pressure in the output of the main valve. However, it is a feature of the invention that a bimetallic strip with a heater is employed to overcome the regulating action of the pilot regulator to cause the main valve to open and to close.

It is also a feature of the invention that the regulator is selectively controlled to provide two different regulated pressures in the output of the main valve for a low fire and a high fire. An electrical circuit and pilot regulator mechanical controls are provided for this purpose. The bimetallic strip heater is connected in the circuit as is the mechanical control.

The above-described and other advantages of the present invention will be better understood from the following description when considered in connection with the accompanying drawings.

BRIEF DESCRIPTION OF THE DRAWINGS

In the drawings, which are to be regarded as merely illustrative:

FIG. 1 is a top plan view, partly in section of one embodiment of the present invention;

FIG. 2 is a side elevational view of two adjusting screws employed in the embodiment shown in FIG. 1;

FIG. 3 is a vertical sectional view taken on the line 3—3 of the device shown in FIG. 1;

FIG. 7 is a vertical sectional view of a third embodiment of the present invention; and FIG. 8 is a different vertical sectional view of the embodiment shown in FIG. 7.

DESCRIPTION OF THE PREFERRED EMBODIMENTS

Figure 4:
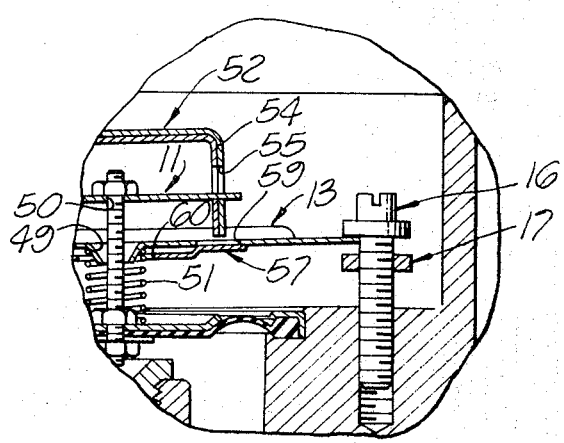
FIG. 4 is an enlarged sectional view of a portion of the device shown in FIG. 3.

The device of the present invention is generally indicated at 10 in FIG. 1. Device 10 has an arm 11 pivoted about a pin 12 and an arm 13 pivoted about the same pin. Both arms 11 and 13 are also shown in FIGS. 3 and 4. Arm 13 is provided with projections 14 and 15. Both arms 11 and 13 are rotatable about pin 12. Rotational movement of arm 10 is limited by engagement of projections 14 and 15 with corresponding adjusting screws 16 and 17, respectively. Adjusting screws 16 and 17 are shown in all FIGS. 1, 2, 3, and 4.

Adjusting screw 16 is a low fire adjusting screw. Adjusting screw 17 is a high fire adjusting screw. Low fire adjusting screw 16 is made of metal and threaded into a metal bushing 18, as shown in FIG. 3. Bushing 18 is fixed inside an insulator 19 that, in turn, is fixed inside the upper body 20 of device 10. Screw 16 has a screwdriver slot insulator 21 fixed to its upper end.

Screw 16 has a threaded shank 22 that is smaller in diameter than a head 23 thereof. Upward vertical movement of arm 13 is limited by engagement of projection 14 with screw head 23. Downward vertical movement of arm 13 is limited by engagement of projection 15 with a flange 24 integral with screw 17. Screw 17 also has a shank 25 threaded into upper body 20, not shown. The function of arms 11 and 13 will be described hereinafter.

As shown in FIG. 3, device 10 has a lower body 26 with an inlet 27, and an outlet 28. Device 10 contains a conventional diaphragm type main valve 29 having a seat 30 on lower body 26. A passageway 31 is provided through lower and upper bodies 26 and 20 to a pilot regulator valve 32 through port 33. Main valve 29 has a diaphragm 34 which divides device 10 into a main chamber 35 and an auxiliary chamber 36. Passageway 31 is in communication with auxiliary chamber 36 through a port 37.

Passageway 31 has a plug 38 fixed therein, having a fluid restriction orifice 39.

Operation of main valve 29 is controlled by a pilot regulator 40, including valve 32 fixed to a shaft 41. A plug 42 is threaded into upper body 20 and provides a seat 43 for valve 32. Regular 40 includes a conventional diaphragm 44, having backup plates 45 and 46 fixed thereto by nuts 47 and 48, respectively threaded to shaft 41.

Arms 13 and 11 have holes 49 and 50 therethrough, respectively, through which shaft 41 projects. Shaft 41 can thus move vertically through holes 49 and 50 without contacting arms 13 and 11. A helically coiled compression spring 51 is located between diaphragm backup plate 45 and arm 13. Spring 51 is located around nut 47. Hole 49 is flared. Spring 51 is also located around the flare of hole 49.

On-Off operation is controlled by a conventional bimetallic strip 52 having a heater winding 53. Strip 52 has a projection 54 at one end with a slot 55. The free end of arm 11 projects through slot 5. Strip 52 has its other end fixed to upper body 20 by a screw 56. Strip 52 has a conventional construction to compensate for changes in ambient temperature.

Downward vertical movement of strip projection 54 causes eventual engagement of the projection with a strain release spring 57 fixed to arm 13 by a rivet 58. Projection 54 extends through a hole 59 in arm 13. Projection 54 can, therefore, push arm 13 down to a position where projection 15 engages flange 24. Should projection 54 tend to move arm 13 further in a downward direction, spring 57 will deflect downwardly from arm 13. Spring 57 has a hole 60 therethrough to allow spring 51 to extend freely therethrough in engagement with arm 13.

Projection 14 is fixed to arm 13 by a rivet 61, but is insulated therefrom by an insulator 62.

Figure 5:
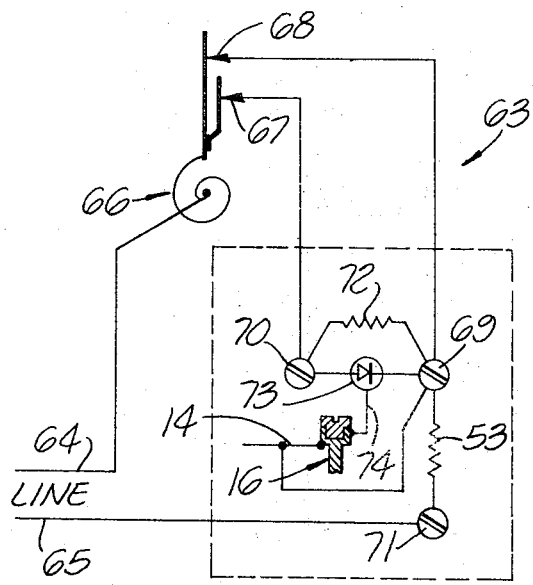
FIG. 5 is a schematic diagram of a circuit employed with the present invention.

A control circuit 63 for the device 10 is shown in FIG. 5. Control circuit 63 has input power lines 64 and 65. Line 64 is connected through a conventional thermostat 66 to low fire contacts 67 and high fire contacts 68. Low fire contacts 67 make before high fire contacts 68 make. Conversely, high fire contacts 68 break before low fire contacts 67 break. The combination of thermostat 66 and contacts 67 and 68 is entirely conventional. A high fire contact 68 is connected to high fire terminal 69. A low fire contact 67 is connected to a low fire terminal 70. Heater winding 53 is connected from terminal 69 to common terminal 71. Line 65 is also connected to terminal 71. Resistor 72 is connected between terminals 69 and 70. A silicon controlled rectifier 73 is also connected between terminals 69 and 70. Rectifier 73 has a gate lead 74 which is connected to head 23 of low fire adjusting screw 16. Arm projection 14 is connected to high fire terminal 69.

In the operation of the device 10, in the circuit 63, if both low fire and high fire contacts 67 and 68 make, high fire contacts 68 shunt rectifier 73 and prevent operation thereof. The line voltage is then connected directly across heater 53. Bimetallic strip protection 54 will then lower vertically and depress arm 13 through spring 57 until projection 15 engages screw flange 24. Bimetallic strip projection 54 may then depress springs 57 further away from arm 13.

In the position shown in FIG. 3, valve 32 is closed because strip 52 raises arm 11, arm 11 engaging the lower end of projection slot 55. Arm 11 lifts shaft 41 by engagement with a nut 75 threaded to shaft 41. Upward vertical movement of shaft 41 thus closes valve 32.

In accordance with the foregoing, when metallic strip 52 and projection 54 move downwardly, arm 11 moves downwardly away from nut 75. Valve 32 is then partially opened by the action of spring 51. It will be appreciated that the maximum pressure of spring 51 on diaphragm backup plate 45 is limited by screw flange 24 which acts as a mechanical stop for arm 13. Maximum regulated outlet pressure for a high fire is thus determined by the elevation of high fire adjusting screw 17.

When valve 32 is closed, the pressure in auxiliary chamber 36 increases to inlet pressure. Spring S then holds main valve 29 closed. When valve 32 opens, gas is exhausted from auxiliary chamber 36 through valve 32 through an internal chamber 76 of regulator 40, which is vented to outlet 28 through passageway 77. Orifice 39 then prevents the pressure in auxiliary chamber 36 from increasing to inlet pressure. A preponderance of inlet pressure below diaphragm 34 will then open main valve 29. Outlet pressure will be regulated by regulator 40 for the high fire setting in that internal chamber 76 is maintained at outlet pressure.

Body 29 forms an external chamber 78 with diaphragm 44 which is open to the atmosphere.

Should high fire contacts 68 open and low fire contacts remain closed, direct line voltage will be removed from heater 53. Projection 54 will then rise until projection 14 contacts low fire adjusting screw head 23. In this case, rectifier 73 will be placed in operation to supply increased current to heater 53. Bimetallic strip 52 will then assume a position such that projection 14 will remain in contact with screw head 23 but will prevent arm 11 from engaging nut 75 to close regulator valve 32. Resistor 72 may be employed to prevent upward overtravel of bimetallic strip 52 tending to close valve 32. Depending upon the design of the device 10, resistor 72 may be omitted.

Note will be taken, low fire adjusting screw 16 acts both as a mechanical stop for arm 13, and an electrical contact for engagement with projection 14. Hence, the minimum compression of spring 51 is controlled by the vertical position of screw 16, and the regulated outlet pressure is reduced a corresponding amount.

Figure 6:
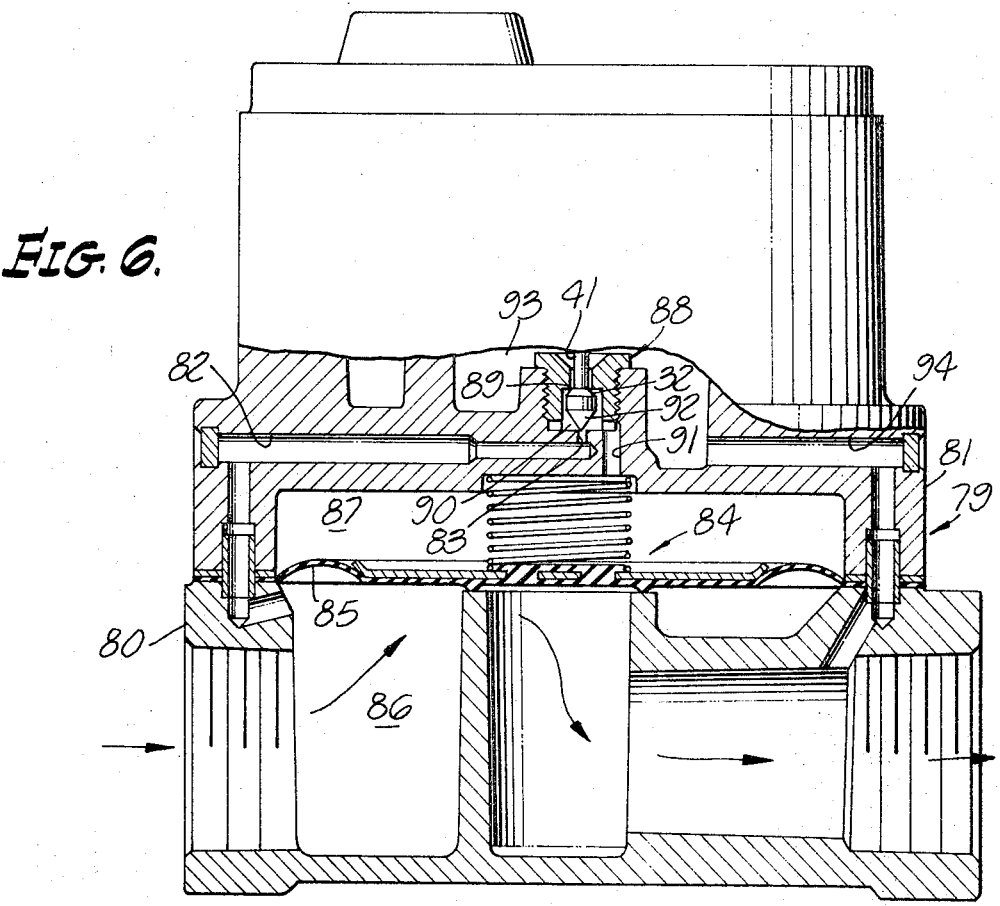
FIG. 6 is a side elevational view, partly in section of an alternative embodiment of the invention.

An alternative embodiment 79 is shown in FIG. 6. Device 79 has a lower body 80 and an upper body 81. Lower body 80 may be identical to lower body 26. The portion of the device 79 shown in elevation in FIG. 6 may be identical to that shown above plug 42 in FIG. 3. Upper body 81 has a passageway 82 similar to passageway 31. However, no plug 38 or orifice 39 is provided. An orifice is provided at 83 to restrict fluid flow. A main valve 84 is provided which may be identical to main valve 29. Main valve 84 has a diaphragm 85 which divides device 79 into a main chamber 86 and an auxiliary chamber 87. Device 79 has a pilot regulator shaft, as before, with a valve 32 fixed thereto. A plug 88 surrounds valve 32 and provides a seat 89 therefor.

Plug 88 and upper body 81 define a cavity 90 around valve 32. Auxiliary chamber 87 lies in communication with cavity 90 through a port 91.

A valve 92 is integral with valve 32. Valve 92 is adapted to seat on and completely close off orifice 83. The circuit 63 may be employed with the embodiment shown in FIG. 6. The operation of device 79 is identical to the operation of the device 10, except that should a maximum demand for outlet pressure exist for either low fire or high fire, pilot regulator 40 may completely close off orifice 83 and therefore allow main valve 84 to open to a maximum extent, auxiliary chamber 87, in that case, being vented to outlet pressure through port 91, cavity 90, plug 88, and internal chamber 93, and a passageway 94.

A third alternative embodiment of the invention is indicated at 95 in FIG. 7. Device 95 includes a lower body 96, an intermediate body 97, and an upper body 98. Device 95 has an inlet 99 and an outlet 100 and an intermediate body 97. Device 95 has a main valve 101 biased by a spring 102 against a seat 103 integral with intermediate body 97. Main valve 101 is guided by a diaphrgam 104 fixed thereto which has vents 105. Inlet pressure is supplied to a ball valve 106' through vents 105 and a passageway 106. Upper body 97 has a plug 107 threaded therein with a seat 108 for valve 106. The portion of the device 95 shown in elevation in FIG. 7 may be identical to the corresponding portion of device 10 shown in FIG. 3.

Plug 107 has a hole 108 therethrough in communication with a chamber 109 defined between a diaphragm 110 and lower body 96 through a passageway 111 shown in FIG. 8.

Pressure in space 109 preponderant to outlet pressure tends to raise a shaft 112 fixed to diaphragm 110, and thereby to open main valve 101.

Device 95 may be employed with circuit 63. In the operation of device 95, maximum upward vertical movement of shaft 41 allows a spring 113 to close ball valve 106. The inside diameter of plug 107 at 114 is spaced only a short distance from shaft 41. The space between plug 114 and shaft 41 therefore, acts as a constriction. With valve 106 closed, chamber 109 is maintained at outlet pressure. Spring 102 then closes 101. During action of the pilot regulator, valve 106 is maintained open to a position for regulator action. Inlet pressure is then admitted to chamber 109 through valve 106, hole 108, and passageway 111. Valve 101 is then opened; the restriction between plug 107 and shaft 41 tending to hold the pressure in chamber 109 up close to inlet pressure. Note will be taken that it is a feature of the invention that the motion of shaft 41 in the construction between it and plug 107 provides a self-cleaning action for the constriction.

Openings 110' are provided in diaphragm 110 so that there is communication between chamber 109 and outlet 100. Openings 110' thus make it possible to cause the closing of valve 103.

From the foregoing, it will be appreciated that the use of bimetallic strip 52 with heater 53, makes possible to overcome the regulator action of spring 51 to close any one of the pilot regulator valves 32 or 106. It is, therefore, possible to obtain either low fire or high fire with a "soft" start. Further, it is possible to obtain On-Off action as well as pressure regulator action at two settings with the self-same pilot regulator 40.

Although only a few specific embodiments of the invention have been illustrated and described, many other changes and modifications will suggest themselves to those skilled in the art. The invention is, therefore, not to be limited to the embodiments selected for this disclosure, the true scope of the invention being defined only in the appended claims.

What is claimed is:

1. A control device comprising: a valve housing; a main valve in said housing; a pilot regulator including an auxiliary valve to control the opening of said main valve, said regulator having a diaphragm and a spring, a first member to hold said spring to bias said diaphragm; and a fire control including first and second stops to limit up and down movement, respectively, of said first member; and power means actuable to move said first member into engagement with one of said stops, said power means being movable to allow said spring to return said first member to a position in engagement with the other stop, said power means including means to close said auxiliary valve while said first member is in engagement with said other stop, said power means actuable to release said auxiliary valve, said spring being positioned to cause said auxiliary valve to open when said power means is so actuated, said stops being positioned to allow said spring to hold said auxiliary valve open under the condition of inlet pressure when said power means releases said auxiliary valve, said auxiliary valve being maintained in a position to be moved responsive to movement of said diaphragm.

2. The invention as defined in claim 1, wherein said main valve is a diaphragm-type valve having a spring to bias it closed, said housing having an inlet to said main valve and an outlet therefrom, said main valve being positioned to divide said housing into a main chamber and an auxiliary chamber, a passageway from said inlet in communication with said auxiliary valve and said auxiliary chamber, a fluid restriction orifice in said passageway, said regulator diaphragm being positioned to defined internal and external chambers, said outlet being in communication with said auxiliary chamber through said internal chamber and said regulator valve, said regulator valve being fixed to and movable with said regulator diaphragm to close when the pressure in said internal chamber increases, said power means including a bimetallic strip and a heater therefor, a linkage operable by said strip to close said auxiliary valve independently of said regulator spring said regulator spring being a compression spring, said first member being movable by said strip, said regulator spring being in compression between said regulator diaphragm and said first member, said fire control including upper and lower spaced projections fixed to said first member, said first and seconds stops being provided for said projections, respectively, said fire control also including a circuit, said circuit comprising a thermostat having high and lower fire contacts, a first power line connected to said thermostat contacts, said heater being connected from said high fire contact to a second power line, a resistor connected from said low fire contact to said high fire contact, full wave controlled component having an anode-cathode circuit connected in parallel with said resistor, said high fire contact being connected to said upper projection, said rectifier having a gate connected to said upper stop.

3. The invention as defined in claim 2, wherein said power means includes a second pivoted member, said first member also being pivoted about the axis of said second member, said auxiliary valve having a shaft, said first member having a first hole therethrough, said valve shaft extending upwardly through said first hole spaced from said first member, said second member being adapted to lift said shaft, said strip being adapted to lift said second member, said first member having a second hole therethrough, a strain release leaf spring covering the bottom of said second hole, said strip being positioned to push said leaf spring downwardly independently of said first member through said second hole.

4. The invention as defined in claim 1, wherein said main valve is a diaphragm-type valve having a spring to bias it closed, said housing having an inlet to said main valve and an outlet therefrom, said main valve diaphragm being positioned to divide said housing into a main chamber and an auxiliary chamber, a passageway from said inlet in communication with said auxiliary valve and said auxiliary chamber, said regulator diaphragm being positoned to define internal and external chambers, said outlet being in communication with said auxiliary chamber through said internal chamber, said regulator valve being movable with said regulator diaphragm to tend to close when the pressure in said internal chamber increases.

5. The invention as defined in claim 4, wherein said power means is disengageable from said auxiliary valve when said power means is actuated and engageable therewith when said power means is deactuated.

6. The invention as defined in claim 4, wherein said first member holds said regulator spring in compression against said regulator diaphragm, said regulator spring tending to press said first member into engagement with said other stop, said power means being actuable to close said regulator valve.

7. The invention as defined in claim 6, wherein said fire control includes a circuit to energize said power means, said first member and said other stop being connected in said circuit in a manner to prevent closing of said regulator valve.

8. The invention as defined in claim 4, wherein said housing includes a fluid restriction orifice in said passageway.

9. The invention as defined in claim 8, wherein said regulator valve is fixed to and movable with said regulator diaphragm to close when the pressure in said internal chamber increases.

10. The invention as defined in claim 8, wherein said regulator includes a third valve fixed to said auxiliary valve in a position movable therewith to close said orifice, said third valve having an enclosure therearound, said auxiliary chamber being in communication with said enclosure.

11. The invention as defined in claim 4, wherein said pilot regulator includes a shaft fixed to said regulator diaphragm in a position to open said valve, said shaft having a uniform cross section throughout its length, a cavity between said internal chamber and said valve, said auxiliary chamber being in communication with said cavity, said cavity having a hole therethrough to said internal chamber, said shaft projecting through said hole in spaced relation thereto, the small space between said shaft and the cavity hole wall providing a constriction between said cavity and said internal chamber, reciprocation of said shaft in said cavity hole providing a self-cleaning action for said constriction.

References Cited

UNITED STATES PATENTS

| | | | |
|---|---|---|---|
| 2,608,349 | 8/1952 | Landgraf et al. | 236—68 X |
| 2,887,123 | 5/1959 | Becker | 137—505.11 |
| 2,987,309 | 6/1961 | Biggle | 137—505.41 X |
| 3,227,370 | 1/1966 | Houser | 236—80 X |
| 3,351,085 | 11/1967 | Allingham | 137—495 |

WILLIAM E. WAYNER, Primary Examiner

U.S. Cl. X.R.

137—489, 495, 505.41; 236—80